US011287038B2

(12) United States Patent
Kato

(10) Patent No.: US 11,287,038 B2
(45) Date of Patent: Mar. 29, 2022

(54) JOINING SUPPORT JIG

(71) Applicant: HONDA MOTOR CO., LTD., Tokyo (JP)

(72) Inventor: Daisuke Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/177,254

(22) Filed: Feb. 17, 2021

(65) Prior Publication Data
US 2021/0285543 A1    Sep. 16, 2021

(30) Foreign Application Priority Data
Mar. 12, 2020    (JP) .............................. JP2020-042579

(51) Int. Cl.
  *B23P 19/00*    (2006.01)
  *F16J 9/14*     (2006.01)
  *F02F 3/24*     (2006.01)

(52) U.S. Cl.
  CPC ................. *F16J 9/145* (2013.01); *F02F 3/24* (2013.01)

(58) Field of Classification Search
  CPC ............ F05D 2230/70; F05D 2230/60; F05D 2220/32; F05D 2230/64; F23R 3/60; F23R 2900/00017
  USPC .......................................... 277/478; 29/700
  See application file for complete search history.

(56) References Cited

U.S. PATENT DOCUMENTS

| | | | |
|---|---|---|---|
| 10,132,243 B2 * | 11/2018 | Jorgensen | ................. F23R 3/60 |
| 10,174,637 B2 * | 1/2019 | Imfeld | .................. F01D 25/285 |
| 2011/0000080 A1 * | 1/2011 | Arase | ..................... F01D 9/023 29/700 |
| 2012/0159955 A1 * | 6/2012 | Shiotani | ................ F01D 25/285 60/752 |
| 2020/0208539 A1 * | 7/2020 | Kadowaki | ................. F02C 7/28 |

FOREIGN PATENT DOCUMENTS

JP    2013-244490    12/2013

* cited by examiner

*Primary Examiner* — Long T Tran
*Assistant Examiner* — James J Kim
(74) *Attorney, Agent, or Firm* — Amin, Turocy & Watson, LLP

(57) ABSTRACT

A joining support jig includes: a cylinder support for supporting a cylinder; an annular body support for supporting an annular body; and a plurality of movable members that can approach or separate from the cylinder. Each of the plurality of movable members extends from the cylinder side to the annular body side and across an abutment surface between the cylinder and the annular body in the thickness direction of the movable member. Further, the movable members are each formed with a gas supply groove that is depressed in the direction away from the cylinder and has an opening opposing the abutment surface.

7 Claims, 6 Drawing Sheets

JOINING SUPPORT JIG

CROSS-REFERENCE TO RELATED APPLICATION

This application is based upon and claims the benefit of priority from Japanese Patent Application No. 2020-042579 filed on Mar. 12, 2020, the contents of which are incorporated herein by reference.

BACKGROUND OF THE INVENTION

Field of the Invention

The present invention relates to a joining support jig that supports a cylinder and an annular body when joining at least one of the inner and outer brims of the annular body with the opening end of the cylinder.

Description of the Related Art

The combustor of a gas turbine engine is composed of a liner and a dome portion. Of these, the liner has a cylindrical inner casing and a cylindrical outer casing that is located a predetermined distance apart from the inner casing. Due to this separation, a gap is formed between the inner casing and the outer casing. The opening end of the inner casing and the opening end of the outer casing are joined to the inner and outer brims of the dome portion, respectively. That is, the dome portion is joined between the inner casing and the outer casing, thereby covering the gap.

The dome portion and the inner casing or the outer casing are joined, for example, by fiber laser welding. That is, a laser beam is applied to the abutment surface between the dome portion and, the inner casing, or the outer casing, to thereby fuse the abutment surface. During this process, spatter particles scatter. In Japanese Laid-Open Patent Publication No. 2013-244490, in order to prevent spatter particles from adhering to the inner circumferential surface of the cylinder, adherence plates are arranged on the interior of the cylinder. Japanese Laid-Open Patent Publication No. 2013-244490 also proposes supplying of a shield gas to the space between the cylinder and the adherence plates.

SUMMARY OF THE INVENTION

The portion on which the laser beam is incident is heated so that the temperature rises, leading to fusing as described above. During this process, if oxygen in the atmosphere is taken into the high-temperature fusion, the weld bead solidified after cooling the fusion contains oxides. With such a weld bead, it is not easy to keep the joint strength for a long period of time.

Further, the vicinity of the abutment surface expands as the temperature rises, and contracts as the temperature falls. When the degree of shrinkage is large, the welded portion deforms so as to be constricted. In order to avoid this, a correcting jig is abutted against the inner casing or the outer casing to perform the welding, so as to prevent excessive deformation. However, in this case, the constricted welded portion may catch the correcting jig, so that it becomes difficult to separate the welded product from the correcting jig.

Moreover, if the inside and outside diameters of the correcting jig are fitted to the diameters of the inner casing and outer casing, the correcting jig cannot be used for the welding of other inner and outer casings of different sizes. That is, the conventionally known correcting jig has a problem that it is poor in versatility. It is therefore an object of the present invention to provide a joining support jig that can prevent a joint portion from being oxidized.

Another object of the present invention is to provide a joining support jig that can easily support a cylinder and be removed from the joined product.

Another object of the present invention is to provide a joining support jig which is excellent in versatility.

According to one aspect of the present invention, provided is a joining support jig that supports a cylinder and an annular body that includes an inner brim and an outer brim, when an abutment surface, at which an opening end of the cylinder and at least one of the inner and outer brims are abutted against each other, is joined, the joining support jig including: a cylinder support configured to support the cylinder; an annular body support configured to support the annular body; and a plurality of movable members each provided in an annular shaped part, having an arc shape when viewed in plan view, extending from a side of the cylinder to a side of the annular body and across the abutment surface in a thickness direction of the movable member, and configured to approach or separate from the cylinder, wherein the movable members are each formed with a gas supply groove which is depressed in a direction away from the cylinder and has an opening opposing the abutment surface.

According to the present invention, since the gas supply groove formed in the movable members is covered with the cylinder and the annular body, it is possible to supply an inert gas toward the abutment surface between the cylinder and the annular body. For this reason, the amount of oxygen is relatively lowered at the welded area in the abutment surface, so that oxidation of the welded area can be suppressed.

Further, when the cylinder is set on the joining support jig, or when the joined product is removed from the joining support jig, the movable members move toward the annular shaped part. That is, the movable members retract from the cylinder or the joined product. Therefore, it is possible to easily support the cylinder and easily separate the joined product.

Moreover, since the movable members move so as to expand or contract in diameter according to the size of the diameter of the cylinder, it is possible to support cylinders of various diameters. That is, the joining support jig can be used for cylinders having various diameters, and is therefore excellent in versatility.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Now, the present invention will be detailed by describing preferred embodiments of the joining support jig with reference to the accompanying drawings.

Figure 1:
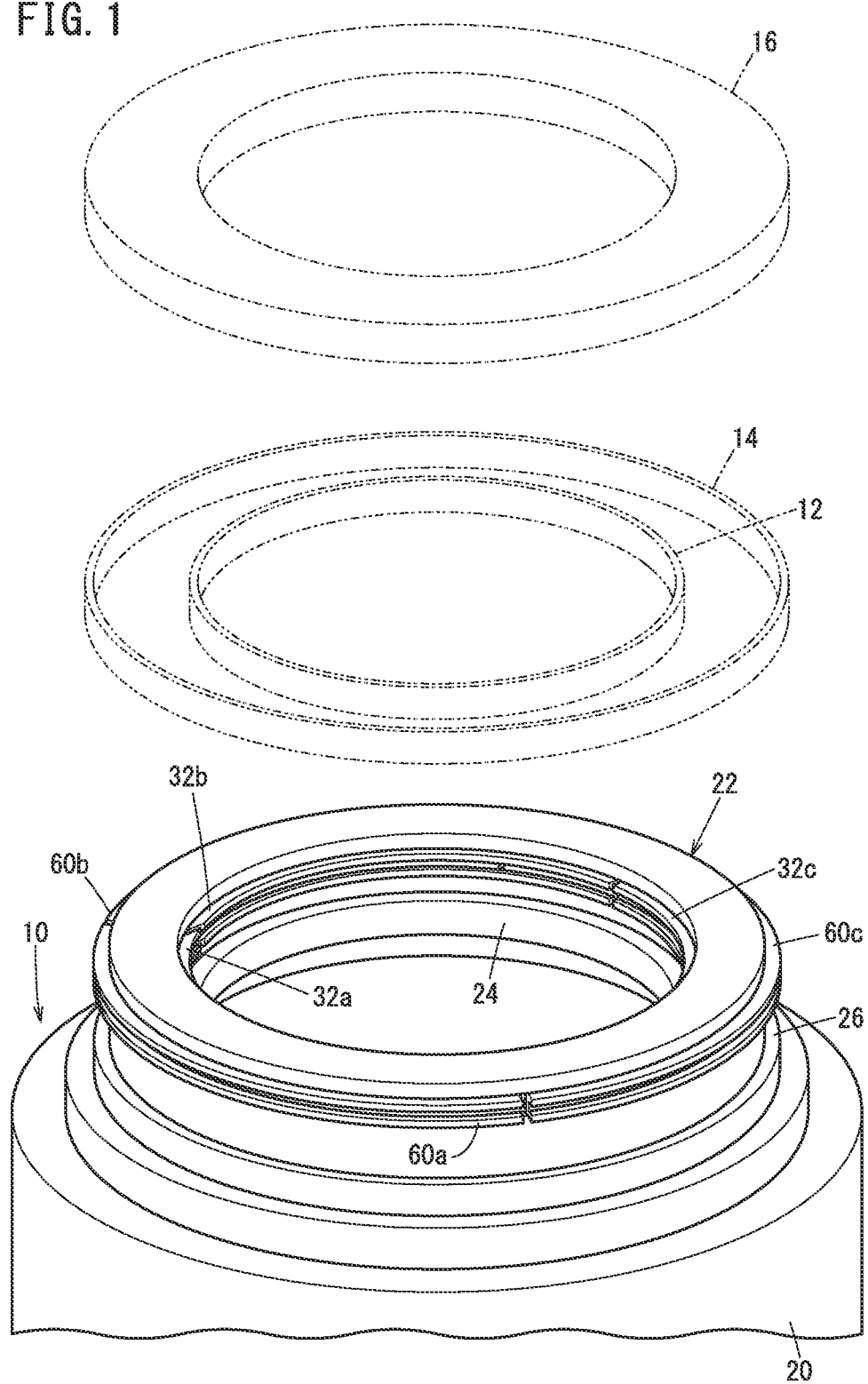
FIG. 1 is a schematic perspective view of a joining support jig according to an embodiment of the present invention.

FIG. 1 is a schematic perspective view of a joining support jig (hereinafter, also simply referred to as "support jig") 10 according to an embodiment of the present invention. The support jig 10 is used when the upper opening end of a first cylinder 12 and the upper opening end of a second cylinder 14 are joined respectively, to the inner and outer brims of an annular body 16. In the figure, each of the above items is depicted imaginarily with two-dot chain lines.

The first cylinder 12 has a slightly short height and a small diameter, and is arranged on the inner circumferential side of the second cylinder 14. The second cylinder 14 has a longer height and a larger diameter than the first cylinder 12, and is arranged concentrically with the first cylinder 12. Therefore, the first cylinder 12 and the second cylinder 14 are separated a predetermined distance from each other, forming a gap therebetween. The first cylinder 12 and the second cylinder 14 are open at both ends.

The annular body 16 is bridged from the upper opening end of the first cylinder 12 to the upper opening end of the second cylinder 14, thereby covering the gap therebetween. As described above, the upper opening end of the first cylinder 12 is joined to the inner brim of the annular body 16, and the upper opening end of the second cylinder 14 is joined to the peripheral edge. Each junction is formed, for example, by fiber laser welding. An example of the first cylinder 12, the second cylinder 14 and the annular body 16 may be an inner casing, an outer casing and a dome portion that constitute a combustor of a gas turbine engine. However, implementation should not be particularly limited to these.

The support jig 10 has a base seat 20 and an annular shaped part 22 provided on the top of the base seat 20. The annular shaped part 22 has a substantially cylindrical shape with a hollow therein, in which an inner support 24 (inner cylinder support) that annularly projects radially inwards is provided. The lower opening end of the first cylinder 12 is placed on the upper surface of the inner support 24. Further, an annular outer support 26 (outer cylinder support) is formed in the bottom of the peripheral wall of the annular shaped part 22. The lower opening end of the second cylinder 14 is placed on the upper surface of the outer support 26.

The annular body 16 is placed on the upper surface of the annular shaped part 22, and is thereby supported by the annular shaped part 22. That is, the upper surface of the annular shaped part 22 forms an annular body support. When the annular body 16 is a dome portion, a fuel supply hole is formed in the annular body 16. Therefore, in this case, a plug member that is passed through the fuel supply hole and closes the fuel supply hole is preferably formed on the upper surface of the annular shaped part 22, although not specifically illustrated.

Figure 2:
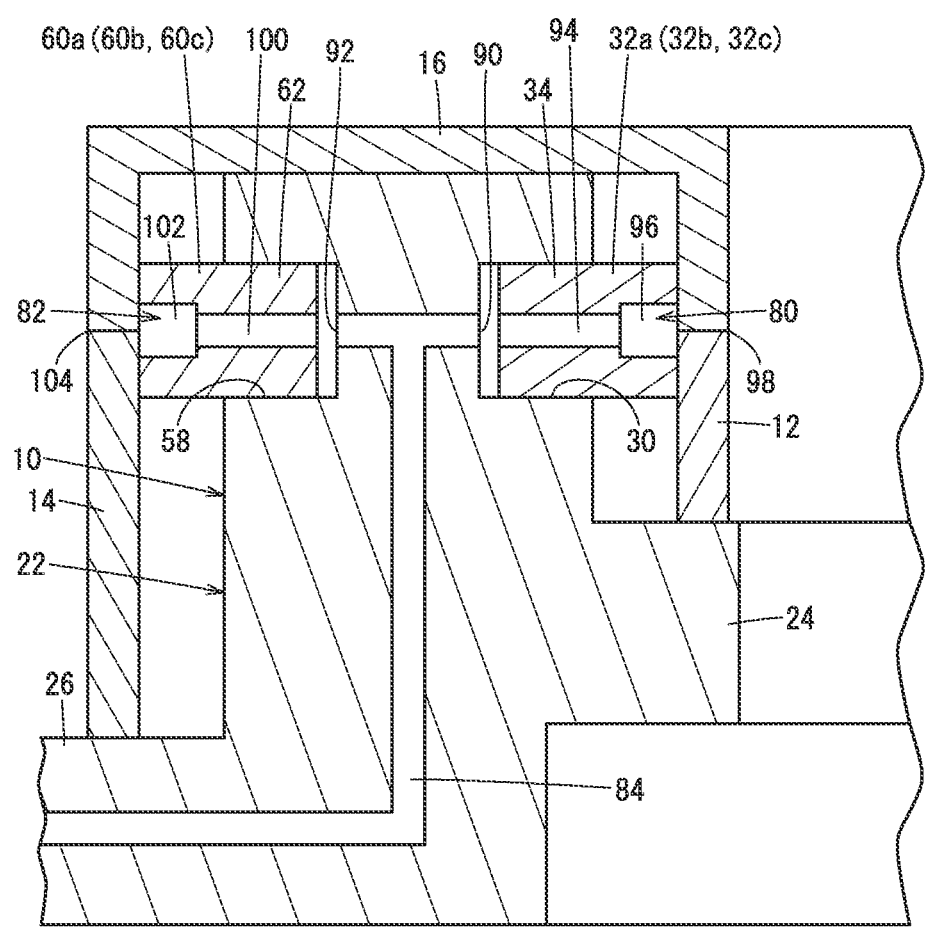
FIG. 2 is a schematic vertical section showing essential parts of an annular portion.
Figure 3:
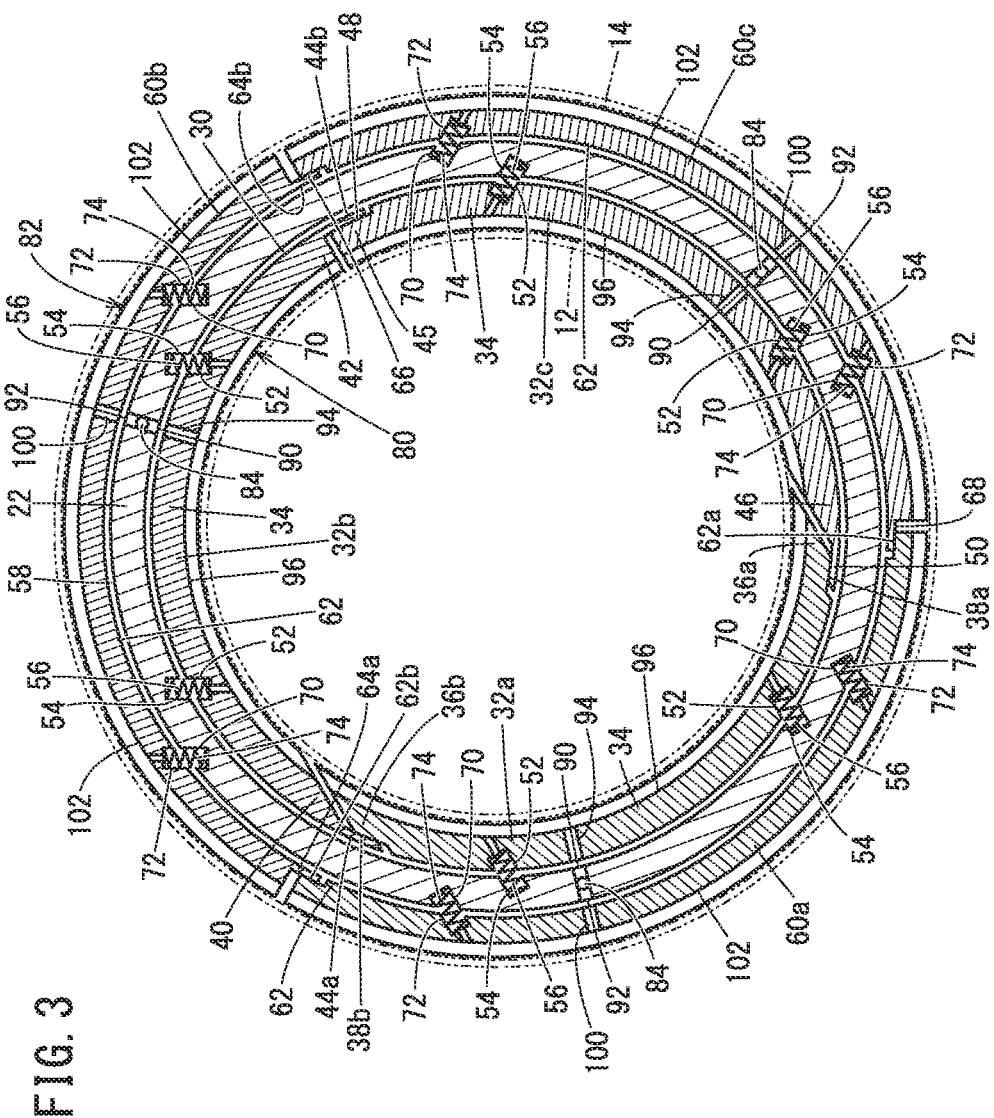
FIG. 3 is a schematic horizontal section showing essential parts of the annular portion.

FIGS. 2 and 3 are schematic vertical and horizontal sections, respectively, of essential parts of the annular shaped part 22. As shown in FIG. 2, the inner circumferential wall of the annular shaped part 22 has an inner insertion groove 30 formed annularly so as to be depressed radially outwards. First to third inner movable members 32a to 32c (see FIG. 3) are set so that their outward projections 34 formed on the peripheral walls thereof are slidably inserted in the inner insertion groove 30. The first to third inner movable members 32a to 32c are exposed from the inner insertion groove 30, and arranged contiguously in a circular shape. Each of the first to third inner movable members 32a to 32c has a substantially arc shape having a central angle of approximately 120°.

As can be seen from FIG. 3, the first inner movable member 32a has a slope at each end with respect to the circumferential direction so that the arc length of the first inner movable member 32a becomes shorter from the inner circumferential side toward the peripheral side. That is, arc-length reducing slopes 36a and 36b are formed in both ends of the first inner movable member 32a with respect to the circumferential direction, as the first slope that allows the arc length to vary. Further, first steps 38a and 38b are formed so as to be depressed radially inwards from the peripheral side on the outer arc edges of the arc-length reducing slopes 36a and 36b, respectively.

The second inner movable member 32b is arranged in the clockwise direction in FIG. 3 with respect to the first inner movable member 32a. The second inner movable member 32b has a first arc-length increasing slope 40 (second slope) opposing the arc-length reducing slope 36b of the first inner movable member 32a. The first arc-length increasing slope 40 is formed so that the arc length of the second inner movable member 32b becomes longer from the inner circumferential side toward the peripheral side, contrary to the arc-length reducing slope 36b. On the other hand, the end of the second inner movable member 32b opposite to the first arc-length increasing slope 40 with respect to the circumferential direction is formed as a first non-inclined end 42 extending linearly in the radial direction of the annular shaped part 22. First tongue pieces 44a and 44b respectively project along the circumferential direction from the peripheral edges of the first arc-length increasing slope 40 and the first non-inclined end 42. The first tongue piece 44a opposes the first step 38b.

The third inner movable member 32c is arranged in the clockwise direction in FIG. 3 with respect to the second inner movable member 32b and in the counterclockwise direction in FIG. 3 with respect to the first inner movable member 32a, and is interposed between the second inner movable member 32b and the first inner movable member 32a. The third inner movable member 32c has a second non-inclined end 45 opposing the first non-inclined end 42, and a second arc-length increasing slope 46 (second slope) opposing the arc-length reducing slope 36a. The second non-inclined end 45, similar to the first non-inclined end 42, extends linearly in the radial direction of the annular shaped part 22. On the other hand, in the second arc-length increasing slope 46, like the first arc-length increasing slope 40, the arc length becomes longer from the inner circumferential side toward the peripheral side.

A second step 48 that is depressed radially inwards from the peripheral side is formed on the peripheral edge of the second non-inclined end 45. The first tongue piece 44b provided on the outer periphery of the first non-inclined end 42 opposes the second step 48. On the other hand, a second tongue piece 50 projects along the circumferential direction from the outer periphery of the second arc-length increasing slope 46. The second tongue piece 50 opposes the first step 38a.

Two first inner spring holes 52 are formed in each of the outward projections 34 of the first to third inner movable members 32a to 32c, while six second inner spring holes 54 are formed in the inner circumferential wall of the inner insertion groove 30. The first inner spring holes 52 oppose respective second inner spring holes 54. An inwardly biasing spring 56 is set in each pair of the first and second inner spring holes 52 and 54, and the first to third inner movable members 32a to 32c are elastically biased by the inwardly biasing springs 56, radially inwards of the annular shaped part 22 (toward the first cylinder 12). Thus, the first to third inner movable members 32a to 32c are supported in a floating manner by the annular shaped part 22 via the inwardly biasing springs 56 which are elastic members.

On the other hand, the peripheral wall of the annular shaped part 22 has an outer insertion groove 58 formed annularly so as to be depressed radially inwards (see FIG. 2). First to third outer movable members 60a to 60c (see FIG. 3) are set so that their inward projections 62 formed on the inner circumferential walls thereof are slidably inserted in the outer insertion groove 58. The first to third outer movable members 60a to 60c are exposed from the outer insertion groove 58, and arranged contiguously in a circular shape. Each of the first to third outer movable members 60a to 60c has a substantially arc shape having a central angle of approximately 120°.

The first to third outer movable members 60a to 60c are located on the outer periphery of the first to third inner movable members 32a to 32c, respectively. That is, the first to third outer movable members 60a to 60c are arranged in this order in the clockwise direction in FIG. 3. It goes without saying that the annular shaped part 22 is interposed between the first to third outer movable members 60a to 60c and the first to third inner movable members 32a to 32c.

The first outer movable member 60a has first depressions 62a and 62b formed on its inner arc edge at both ends in the circumferential direction so that the depressions are cut out to be depressed radially outwards form the inner arc edge. On the other hand, first projections 64a and 64b extending in the circumferential direction are formed on the inner arc of the second outer movable member 60b at both ends in the circumferential direction. Formed on the inner arc of the third outer movable member 60c at both ends in the circumferential direction are a second depression 66 that is depressed radially outwards from the inner arc edge and a second projection 68 that is protruded in the circumferential direction. The first projection 64a opposes the first depression 62b, and the first projection 64b opposes the second depression 66. Further, the second projection 68 opposes the first depression 62a.

Six first outer spring holes 70 are formed on the peripheral wall of the annular shaped part 22, and two second outer spring holes 72 are formed in each of the inner circumferential walls of the first to third outer movable members 60a to 60c. Of course, the first outer spring holes 70 oppose respective second outer spring holes 72. An outwardly biasing spring 74 is set in each pair of the first and second outer spring holes 70 and 72, so that the first to third outer movable members 60a to 60c are elastically biased by the outwardly biasing springs 74, radially outwards of the annular shaped part 22 (toward the second cylinder 14). That is, the first to third outer movable members 60a to 60c are supported in a floating manner by the annular shaped part 22 via the outwardly biasing springs 74 which are elastic members.

Figure 4:
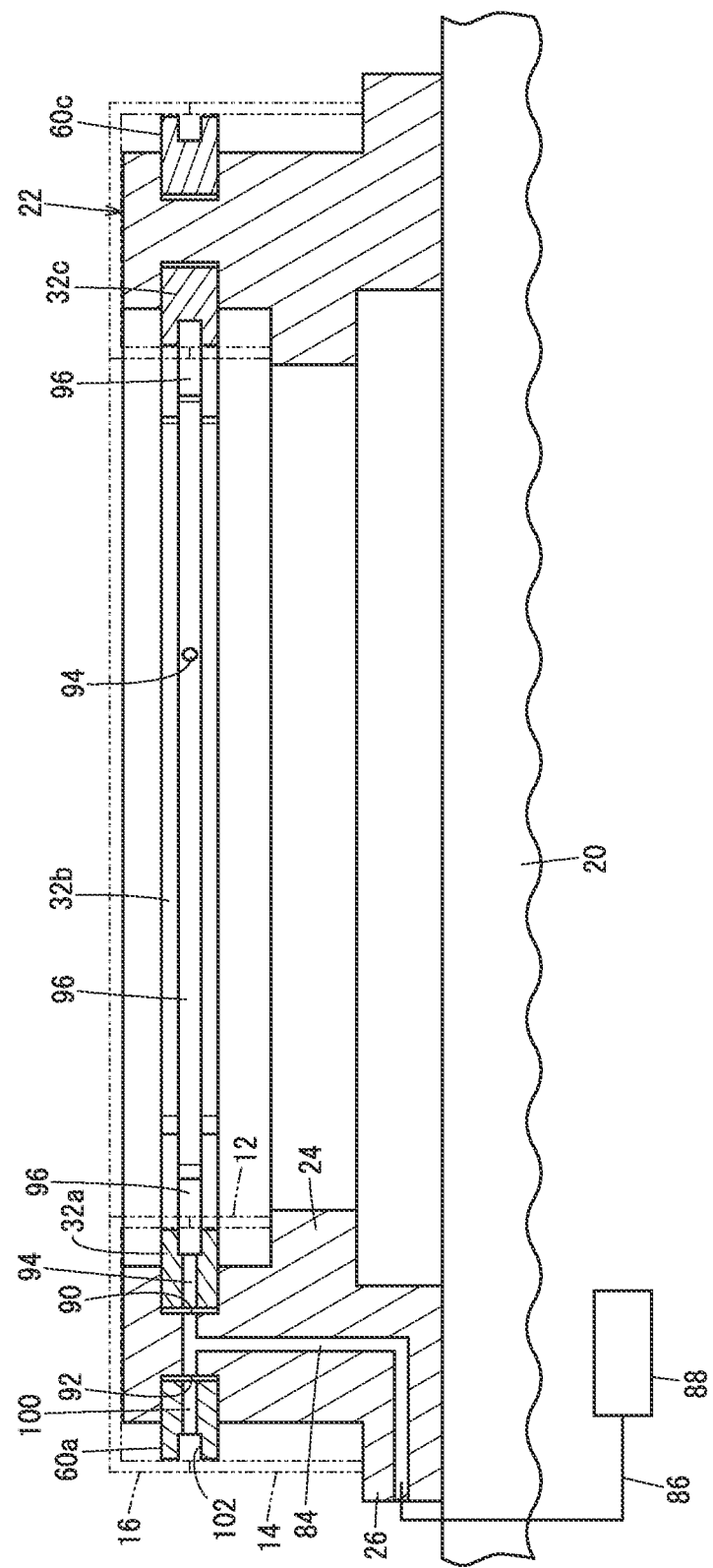
FIG. 4 is an overall schematic vertical section showing the annular portion.

In the above, the first to third inner movable members 32a to 32c constitute an inner circumferential gas supplier 80, and the first to third outer movable members 60a to 60c constitute a peripheral gas supplier 82. Specifically, as shown in FIG. 4, a flow passage 84 is formed inside the annular shaped part 22. An inert gas supply source 88 (for example, a gas cylinder or the like) for supplying argon gas or the like is connected to the upstream side of the flow passage 84 via a pipe 86. Further, the downstream side of the flow passage 84 is opened at multiple sites as inner air supply ports 90 and outer air supply ports 92 in the bottom of the inner insertion groove 30 and the outer insertion groove 58.

As shown in FIG. 4, the outward projections 34 of the first to third inner movable members 32a to 32c each have an inner guide path 94 formed so as to penetrate in the direction from the inner circumferential wall side to the peripheral wall side of the annular shaped part 22. The inner guide path 94 is connected to the flow passage 84 at the inner air supply port 90. Further, the first to third inner movable members 32a to 32c are each formed with an inward supply groove 96 (gas supply groove) depressed radially outwards in the direction away from the first cylinder 12. The inner guide path 94 is connected to the inward supply groove 96. Therefore, the inert gas such as argon supplied from the inert gas supply source 88 flows through the pipe 86 and the flow passage 84, and is introduced into the inward supply groove 96 via the inner air supply port 90 and the inner guide path 94. The inward supply groove 96 forms an annular inward opening that opposes the first cylinder 12.

As shown in FIG. 2, the radially inward edge portion on the inner circumferential side of the first to third inner movable members 32a to 32c, i.e., the lower inner arc edge and the upper inner arc edge project relative to the inward supply groove 96. The lower inner arc edge abuts the peripheral wall of the first cylinder 12 near the upper opening end thereof while the upper inner arc edge abuts the interior wall of the annular body 16 near the inner brim thereof. Therefore, the inward supply groove 96 (or each of the first to third inner movable members 32a to 32c in the thickness direction) is positioned so as to extend across a first abutment surface 98 at which the upper opening end of the first cylinder 12 and the inner brim of the annular body 16 are abutted. Further, the inward opening of the inward supply groove 96 opposes the first abutment surface 98. This inward opening is covered by the peripheral wall of the first cylinder 12 near the upper opening end thereof and the interior wall of the annular body 16 near the inner brim thereof. As a result, the inward supply groove 96 is confined to form a closed space.

In contrast, the inward projections 62 of the first to third outer movable members 60a to 60c each have an outer guide path 100 formed so as to penetrate in the direction from the inner circumferential wall side to the peripheral wall side of the annular shaped part 22 (see FIG. 4). The outer guide path 100 is connected to the flow passage 84 at the outer air supply port 92. Further, the first to third outer movable members 60a to 60c are each formed with an outward supply groove 102 (gas supply groove) depressed radially inwards in the direction away from the second cylinder 14. The outer guide path 100 is connected to the outward supply groove 102. Therefore, the inert gas such as argon supplied from the inert gas supply source 88 flows through the pipe 86 and the flow passage 84, and is introduced into the outward supply groove 102 via the outer air supply port 92 and the outer guide path 100. The outward supply groove 102 forms an annular outward opening that opposes the second cylinder 14.

As shown in FIG. 2, the radially outward edge portion on the peripheral side of the first to third outer movable members 60a to 60c. i.e., the lower outer arc edge and the upper outer arc edge project relative to the outward supply groove 102. The lower outer arc edge abuts the inner circumferential wall of the second cylinder 14 near the upper opening end thereof while the upper outer arc edge abuts the interior wall of the annular body 16 near the outer brim. Therefore, the outward supply groove 102 (or each of the first to third outer movable members 60a to 60c in thickness direction) is positioned so as to extend across a second abutment surface 104 at which the upper opening end of the second cylinder 14 and the outer brim of the annular body 16 are abutted. Further, the outward opening of the outward supply groove 102 opposes the second abutment surface 104. This outward opening is covered by the inner circumferential wall of the second cylinder 14 near the upper opening end thereof and the interior wall of the annular body 16 near the outer brim thereof. As a result, the outward supply groove 102 is confined to form a closed space.

The joining support jig 10 according to the present embodiment is basically configured as described above, and the operation and effect thereof will be described next.

Figure 5:
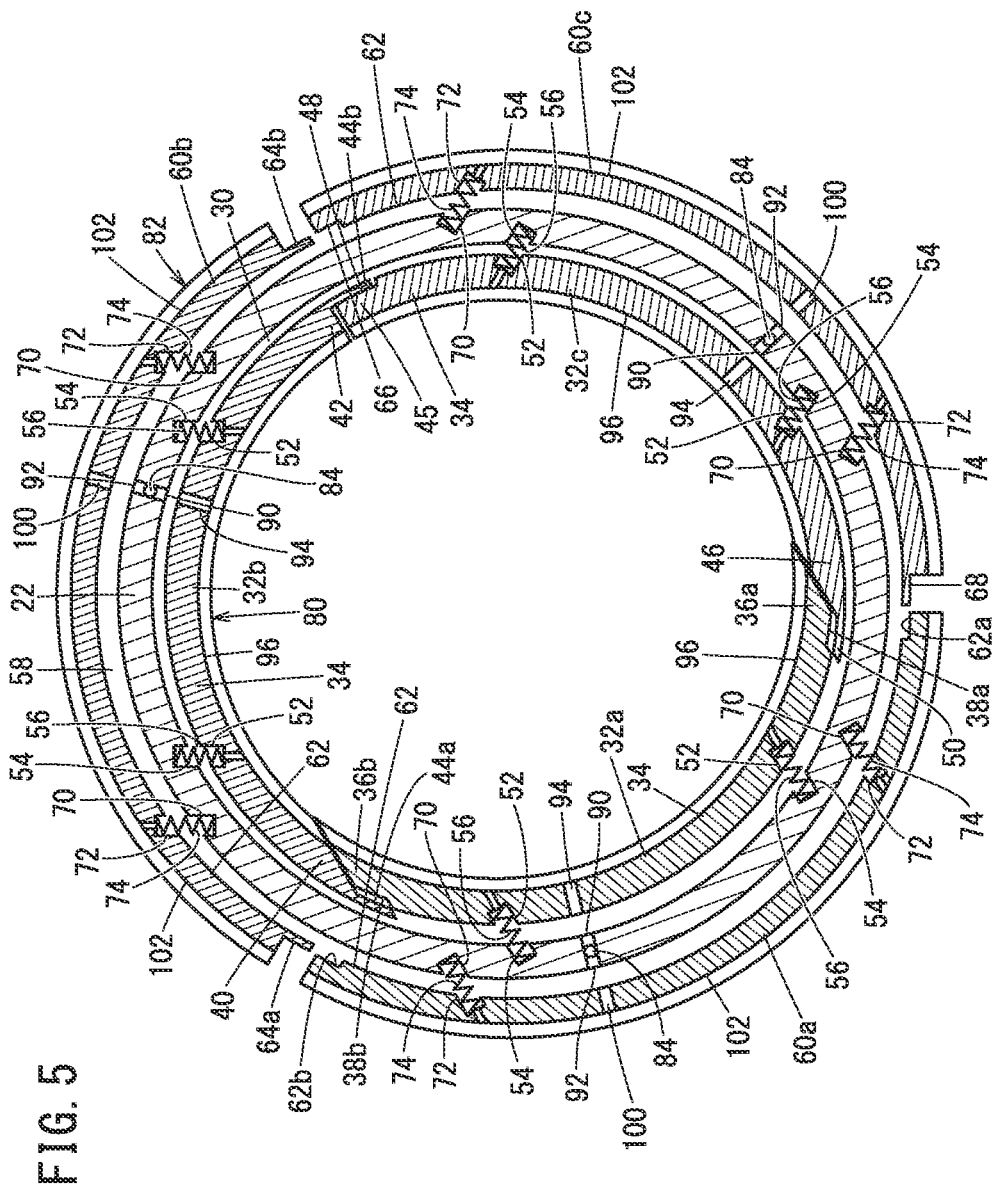
FIG. 5 is a schematic horizontal section showing essential parts when all the movable members project to the maximum.

When the joining support jig 10 does not support any of the first cylinder 12, the annular body 16 and the second cylinder 14, the first to third inner movable members 32a to 32c are elastically biased by the inwardly biasing springs 56. Therefore, as shown in FIG. 5, the amount of projection of each of the first to third inner movable members 32a to 32c exposed from the inner insertion groove 30 is maximized. At this time, the virtual circle defined by the first to third inner movable members 32a to 32c has the minimum diameter, which is slightly smaller than the outside diameter of the first cylinder 12.

Similarly, the first to third outer movable members 60a to 60c receive elastic biasing force from the outwardly biasing springs 74. Therefore, the amount of projection of each of the first to third outer movable members 60a to 60c exposed from the outer insertion groove 58 is maximized. In this state, the virtual circle defined by the first to third outer movable members 60a to 60c has the maximum diameter, which is slightly larger than the inside diameter of the second cylinder 14.

In this state, the lower opening end of the first cylinder 12 is set on the upper surface of the inner support 24. Since the outside diameter of the first cylinder 12 is larger than the diameter of the virtual circle defined by the first to third inner movable members 32a to 32c, the first to third inner movable members 32a to 32c are pressed by the peripheral wall of the first cylinder 12. As a result, the inwardly biasing springs 56 are compressed, and the first to third inner movable members 32a to 32c are displaced so as to be pushed back into the inner insertion groove 30 that is located therearound (see FIG. 2).

The amount of displacement of each of the first to third inner movable members 32a to 32c due to being pushed back is substantially equal to the difference obtained by subtracting the minimum diameter of the virtual circle defined by the first to third inner movable members 32a to 32c, from the outside diameter of the first cylinder 12. At this point of time, each of the lower inner arc edges of the first to third inner movable members 32a to the 32c comes into contact with the peripheral wall of the first cylinder 12 near the upper opening end thereof.

Next, the lower opening end of the second cylinder 14 is set on the upper surface of the outer support 26. Since the inside diameter of the second cylinder 14 is smaller than the diameter of the virtual circle defined by the first to third outer movable members 60a to 60c, the first to third outer movable members 60a to 60c are pressed by the inner circumferential wall of the second cylinder 14. As a result, the outwardly biasing springs 74 are compressed, and the first to third outer movable members 60a to 60c are displaced so as to be pushed back into the outer insertion groove 58 that is located therearound. The amount of displacement of each of the first to third outer movable members 60a to 60c due to being pushed back is substantially equal to the difference obtained by subtracting the inside diameter of the second cylinder 14 from the maximum diameter of the virtual circle defined by the first to third outer movable members 60a to 60c. At this point of time, each of the lower outer arc edges of the first to third outer movable members 60a to 60c comes into contact with the inner circumferential wall of the second cylinder 14 near the upper opening end thereof.

Thus, in the present embodiment, the first to third inner movable members 32a to 32c are supported in a floating manner by the annular shaped part 22 via the inwardly biasing springs 56, whereas the first to third outer movable members 60a to 60c are supported in a floating manner by the annular shaped part 22 via the outwardly biasing springs 74.

Accordingly, if a cylinder having a different inside or outside diameter is set on the annular shaped part 22 as the first cylinder 12 or the second cylinder 14, the amounts of compression of the inwardly biasing springs 56 or the outwardly biasing springs 74 appropriately change. Correspondingly, the amounts of displacement of the first to third inner movable members 32a to 32c or the first to third outer movable members 60a to 60c also change when they are pushed back.

Therefore, even if the outside diameter of the first cylinder 12 and the inside diameter of the second cylinder 14 are varied, the lower inner arc edges of the first to third inner movable members 32a to 32c can be abutted against the peripheral wall of the first cylinder 12 near the upper opening end thereof while the lower outer arc edges of the first to third outer movable members 60a to 60c can be abutted against the inner circumferential wall of the second cylinder 14 near the upper opening end thereof. Therefore, according to the present embodiment, it is possible to deal with the first cylinder 12 and the second cylinder 14 having various diameters. That is, the support jig 10 is excellent in versatility.

Figure 6A:
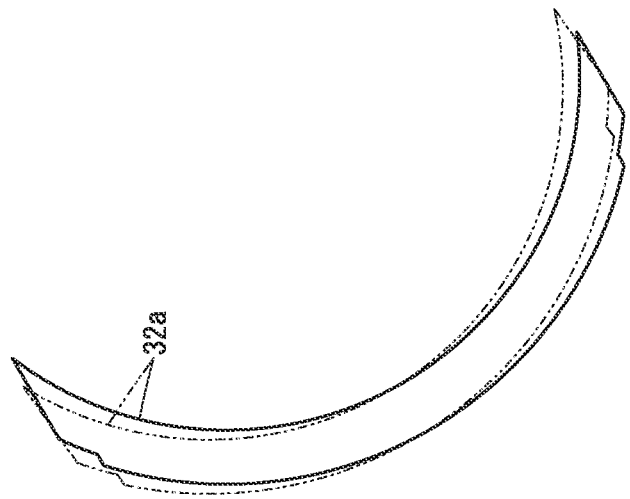
FIGS. 6A and 6B are plan views of essential parts showing a state in which a movable member is inclined.
Figure 6B:
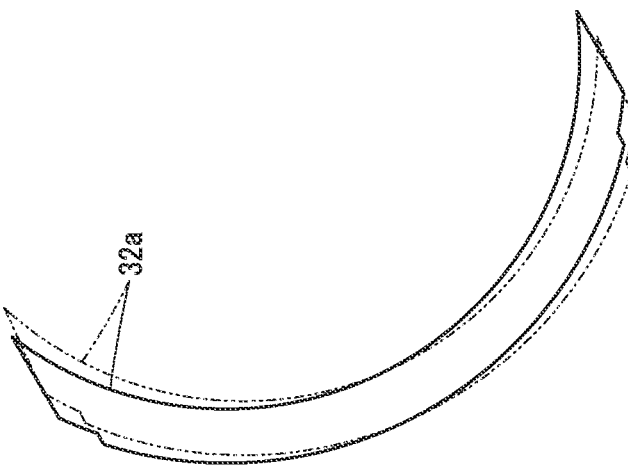

Herein, for example, there are cases where the roundness of the first cylinder 12 is relatively low. Alternatively, the center of the annular shaped part 22 and the center of the first cylinder 12 may be misaligned. Since the first to third inner movable members 32a to 32c are supported in a floating manner by the annular shaped part 22, for example, the arc-length reducing slopes 36a and 36b can each project radially inwards relative to the other end, as shown by the virtual lines in FIGS. 6A and 6B. The same applies to the first and second arc-length increasing slopes 40, 46, and the like. Therefore, even when the roundness of the first cylinder 12 is relatively low, or when the center of the annular shaped part 22 and the center of the first cylinder 12 are misaligned, the first to third inner movable members 32a to 32c can closely contact the peripheral wall of the first cylinder 12.

In this way, by providing, in the arc ends of the first to third inner movable members 32a to 32c, the arc-length reducing slopes 36a and 36b as well as the first and second arc-length increasing slopes 40 and 46, any of the arc-length reducing slopes 36a and 36b, the first and second arc-length increasing slopes 40 and 46 can protrude radially inwards relative to the other end, in other words, the first to third inner movable members 32a to 32c can take inclined postures relative to the circumference depending on the shape or position of the first cylinder 12. Thus, it is possible for the first to third inner movable members 32a to 32c to firmly support the first cylinder 12.

Although, in the above example, the first cylinder 12 is set on the inner support 24 first, then the second cylinder 14 is set on the outer support 26, it goes without saying that the first cylinder 12 is set on the inner support 24 after the second cylinder 14 has been set on the outer support 26.

Next, the annular body 16 is placed on the upper surface of the annular shaped part 22. At this point, the upper inner arc edges of the first to third inner movable members 32a to 32c abut the interior wall of the annular body 16 near the inner brim thereof while the upper outer arc edges of the first to third outer movable members 60a to 60c abut the interior wall of the annular body 16 near the outer brim thereof. Further, the upper opening end of the first cylinder 12 and the inner brim of the annular body 16 come into contact with each other to form the first abutment surface 98 while the upper opening end of the second cylinder 14 and the outer brim of the annular body 16 come into contact with each other to form the second abutment surface 104. Further, the inward opening of the inward supply groove 96 is closed by the first cylinder 12 and the annular body 16, and the outward opening of the outward supply groove 102 is closed by the second cylinder 14 and the annular body 16.

In this state, an inert gas such as argon is supplied from the inert gas supply source 88. The inert gas passes through the pipe 86 and the flow passage 84 in the annular shaped part 22, and is supplied through the inner air supply port 90 and the inner guide path 94 to the inward supply groove 96, and through the outer air supply port 92 and the outer guide path 100 to the outward supply groove 102. Since the inward opening of the inward supply groove 96 and the outward opening of the outward supply groove 102 are closed as described above, the inert gas stays inside the inward supply groove 96 and the outward supply groove 102. That is, the inert gas is stored in the closed space.

Next, each of the first abutment surface 98 and the second abutment surface 104 is joined. In this embodiment, fiber laser welding is selected as a joining method herein. That is, the hand-held torch of a fiber laser welding machine is opposed to the first abutment surface 98, and a laser beam is output from the hand-held torch to the first abutment surface 98. As a result, the laser beam is incident on the predetermined portion of the first abutment surface 98 so that the predetermined portion becomes hot and fuses. Then, as the laser beam moves away from the predetermined portion, the temperature of the predetermined portion lowers, so that the fusion solidifies. The first abutment surface 98 is joined around the entire circumference by relatively moving the hand-held torch around along the first abutment surface 98 so as to successively cause the above phenomenon.

In order to relatively move the hand-held torch along a circular path over the first abutment surface 98, the joining support jig 10 may be set on a turntable, and the turntable may be rotated with the hand-held torch positioned and fixed. Or, conversely, the hand-held torch may be moved circumferentially along the first abutment surface 98 with the joining support jig 10 positioned and fixed.

During this process, the inert gas is supplied from the inward opening of the inward supply groove 96. Therefore, in the vicinity of the welded area in the first abutment surface 98, the amount of oxygen lowers relatively. Therefore, it is possible to prevent oxygen from being mixed into the welded area during welding and oxides from being generated at the welded area due to mixing of oxygen.

Also, when the laser beam is incident, the irradiated area becomes hot and tends to be thermally expanded. Here, the peripheral wall of the first cylinder 12 is supported by the first to third inner movable members 32a to 32c. For this reason, thermal expansion of the first cylinder 12 is suppressed so that deformation of the first cylinder 12 can be suppressed. When the pressing force resulting from thermal expansion of the first cylinder 12 exceeds the elastic biasing force of the inwardly biasing springs 56, the inwardly biasing springs 56 contract so that the first to third inner movable members 32a to 32c are displaced radially outwards. As a result, it is possible to avoid a situation in which the first to third inner movable members 32a to 32c tighten the first cylinder 12 that is being thermally expanded. Further, it is also possible to prevent deformation such as constriction of the first cylinder 12 due to this tightening.

In the latter case, when the temperature of the fused area drops as the laser beam moves away, the first to third inner movable members 32a to 32c are elastically biased by the inwardly biasing springs 56, and return radially inwards to the initial position. For this reason, even when the first cylinder 12 expands or contracts, the first to third inner movable members 32a to 32c continue to be in close contact with the first cylinder 12. Accordingly, the first cylinder 12 is kept supported by the first to third inner movable members 32a to 32c. That is, it is possible to avoid formation of a gap between the first cylinder 12 and the first to third inner movable members 32a to 32c, hence prevent the inert gas from leaking through the gap. Therefore, it is possible to avoid formation of oxides due to shortage of the inert gas.

Further, in the present embodiment, the second arc-length increasing slope 46 and the first arc-length increasing slope 40 oppose the arc-length reducing slopes 36a and 36b, respectively. Therefore, the opposing geometry of the arc-length reducing slope 36a and the second arc-length increasing slope 46, and that of the arc-length reducing slope 36b and the first arc-length increasing slope 40 each form a so-called labyrinth flow path. Similarly, the opposing geometry of the first step 38b and the first tongue piece 44a, that of the second step 48 and the first tongue piece 44b, and that of the first step 38a and the second tongue piece 50 each form a labyrinth flow path. It is difficult for the inert gas introduced from the inner air supply port 90 formed in the inner insertion groove 30 to flow through such a labyrinth flow path.

That is, the formation of the labyrinth flow paths makes it difficult for the inert gas to flow round to the back side of the first to third inner movable members 32a to 32c. As a result, the inert gas will not leak between the first inner movable member 32a and the second inner movable member 32b or between the first inner movable member 32a and the third inner movable member 32c. In other words, the inert gas easily passes through the inner guide path 94 and is supplied into the inward supply groove 96.

After completing joining of the first cylinder 12 and the annular body 16 as described above, the second cylinder 14 and the annular body 16 are joined. That is, the hand-held torch is opposed to the second abutment surface 104 to irradiate the laser beam toward the second abutment surface 104. By relatively moving the hand-held torch around and along the second abutment surface 104 in the same manner as described above, the second abutment surface 104 is joined in whole circumference.

During this process, the inert gas is supplied from the outward opening of the outward supply groove 102. Therefore, the amount of oxygen lowers relatively in the vicinity of the welded area of the second abutment surface 104. Therefore, also on the second abutment surface 104 on the peripheral side, it is possible to prevent oxygen from being mixed into the welded area during welding and oxides from being generated due to mixing of oxygen.

When the laser irradiated area becomes hot and is thermally expanded while the laser beam is incident, the first to third outer movable members 60a to 60c in contact with the inner circumferential wall of the second cylinder 14 are elastically biased by the outwardly biasing springs 74. As a result, following the thermal expansion of the second cylinder 14, the first to third outer movable members 60a to 60c are displaced radially outwards and increase in diameter. When the temperature of the fused area drops as the laser beam moves away, the first to third outer movable members 60a to 60c receive pressing force in excess of the elastically biasing force of the outwardly biasing springs 74 from the shrinking second cylinder 14. As a result, the first to third outer movable members 60a to 60c move radially inwards, following the shrinking second cylinder 14. In this way, while the second cylinder 14 expands or contracts, the first to third outer movable members 60a to 60c continue to be in close contact with the second cylinder 14. Thus, deformation of the second cylinder 14 is suppressed.

The joining of the annular body 16 and the first cylinder 12, and the joining of the annular body 16 and the second cylinder 14 can be implemented in any order.

After joining is completed, the joined product is separated from the support jig 10. That is, the joined product is gripped by the operator's hand or the robotic hand, and is raised relative to the support jig 10. At this time, the first to third inner movable members 32a to 32c are pressed by the peripheral wall of the first cylinder 12 constituting the joined product, and displaced radially outwards of the annular shaped part 22. On the other hand, the first to third outer movable members 60a to 60c are pressed by the inner circumferential wall of the second cylinder 14 constituting the joined product, and displaced radially inwards of the annular shaped part 22. During the displacement, the inwardly biasing springs 56 and the outwardly biasing springs 74 are, of course, compressed.

In this way, the first to third inner movable members 32a to 32c and the first to third outer movable members 60a to 60c, which all are supported in a floating manner by the annular shaped part 22, retract so as to separate from the joined product. Therefore, the joined product can be easily removed from the annular shaped part 22.

The present invention is not particularly limited to the above-described embodiment, and various modifications can be made without departing from the gist of the present invention.

For example, the above embodiment illustrates the support jig 10 for joining the first cylinder 12 and the second cylinder 14 to the annular body 16. However, a joining support jig for either the first cylinder 12 or the second cylinder 14 may be provided. In the joining support jig for only the first cylinder 12, movable members may be provided on the inner circumferential side only, whereas in the joining support jig for only the second cylinder 14, movable members may be provided on the peripheral side, only.

Further, at least one of the inner support 24 and the outer support 26 may be provided on the base seat 20.

What is claimed is:

1. A joining support jig that supports a cylinder and an annular body that includes an inner brim and an outer brim, when an abutment surface, at which an opening end of the cylinder and at least one of the inner and outer brims are abutted against each other, is joined, the joining support jig comprising:
a cylinder support configured to support the cylinder;
an annular body support configured to support the annular body; and
a plurality of movable members each provided in an annular shaped part, having an arc shape when viewed in plan view, extending from a side of the cylinder to a side of the annular body and across the abutment surface in a thickness direction of the movable member, and configured to approach or separate from the cylinder,
wherein the movable members are each formed with a gas supply groove which is depressed in a direction away from the cylinder and has an opening opposing the abutment surface.

2. The joining support jig according to claim 1, wherein:
the cylinder support includes an inner cylinder support and an outer cylinder support;
the inner cylinder support supports, as the cylinder, a first cylinder whose opening end abuts the inner brim of the annular body, whereas the outer cylinder support supports, as the cylinder, a second cylinder whose opening end abuts the outer brim of the annular body; and
the movable members include inner movable members arranged on an inner circumferential side of the annular shaped part so as to oppose the first cylinder, and outer movable members arranged on a peripheral side of the annular shaped part so as to oppose the second cylinder.

3. The joining support jig according to claim 1, wherein radial edge portions projecting relative to the gas supply groove are formed in each of the movable members and are configured to abut the annular body and the cylinder to allow the gas supply groove to become a closed space.

4. The joining support jig according to claim 1, wherein the annular shaped part is formed with a flow passage, and each of the movable members is formed with a guide path that is connected to the flow passage and the gas supply groove.

5. The joining support jig according to claim 1, further comprising elastic members configured to elastically bias the movable members toward the cylinder.

6. The joining support jig according to claim 5, wherein the movable members are supported in a floating manner by the annular shaped part via the elastic members.

7. The joining support jig according to claim 1, wherein at least one of the movable members includes an arc end having a first slope that allows an arc length of the movable member to vary from an inner circumferential side toward a peripheral side, and another of the movable members includes an arc end having a second slope that is inclined in an opposite direction to a direction in which the first slope is inclined.

* * * * *